US008412020B2

(12) United States Patent
Abe

(10) Patent No.: US 8,412,020 B2
(45) Date of Patent: Apr. 2, 2013

(54) DATA PROCESSING APPARATUS AND ITS CONTROL METHOD, PROGRAM, AND STORAGE MEDIUM

(75) Inventor: Isao Abe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1665 days.

(21) Appl. No.: 11/226,259

(22) Filed: Sep. 15, 2005

(65) Prior Publication Data

US 2006/0077770 A1 Apr. 13, 2006

(30) Foreign Application Priority Data

Sep. 21, 2004 (JP) ................................. 2004-273973
Aug. 17, 2005 (JP) ................................. 2005-236736

(51) Int. Cl.
*H04N 5/765* (2006.01)
*H04N 5/931* (2006.01)
(52) U.S. Cl. ........................................ 386/200; 386/204
(58) Field of Classification Search ....................... 386/46
See application file for complete search history.

(56) References Cited

U.S. PATENT DOCUMENTS

| 6,091,047 | A  | * | 7/2000  | Miyakawa et al. ...... 219/121.68 |
| 6,538,344 | B1 | * | 3/2003  | Yang et al. ........................ 307/66 |
| 6,731,577 | B2 | * | 5/2004  | Suzuki ......................... 369/47.33 |
| 6,829,582 | B1 | * | 12/2004 | Barsness ........................ 704/275 |
| 6,956,613 | B2 |   | 10/2005 | Fujisawa ........................ 348/372 |
| 7,123,554 | B2 | * | 10/2006 | Kaku ............................. 369/47.1 |
| 2002/0038436 | A1 | * | 3/2002  | Suzuki ............................... 714/6 |
| 2002/0172114 | A1 | * | 11/2002 | Shimizu et al. ............. 369/47.51 |
| 2002/0186961 | A1 | * | 12/2002 | Kikuchi et al. .................. 386/98 |
| 2003/0016602 | A1 |   | 1/2003  | Wada et al. .................. 369/47.3 |
| 2003/0151992 | A1 | * | 8/2003  | Fujimoto et al. ........... 369/47.14 |
| 2003/0223012 | A1 |   | 12/2003 | Fujisawa ........................ 348/372 |
| 2003/0227846 | A1 | * | 12/2003 | Lee et al. .................... 369/53.21 |
| 2006/0114779 | A1 |   | 6/2006  | Wada et al. .................. 369/47.3 |

FOREIGN PATENT DOCUMENTS

| CN | 1392541 A | 1/2003 |
| CN | 1467677 A | 1/2004 |
| JP | 8-153040  | 6/1996 |

OTHER PUBLICATIONS

Chinese Official Action and its English translation, dated Sep. 14, 2007, regarding Application No. 200510109981.4.

* cited by examiner

*Primary Examiner* — William C Vaughn, Jr.
*Assistant Examiner* — Oluwaseun A Adegeye
(74) *Attorney, Agent, or Firm* — Fitzpatrick, Cella, Harper & Scinto

(57) ABSTRACT

This invention provides a disk playback apparatus which can shorten a time from when a power switch is turned on until a startup operation is completed. Even when the power switch of the main body is OFF, if exchange of a disk-like recording medium is detected, management data of the disk is read out and is stored in a buffer memory. When the power switch is turned on for the next time, the management data is read out from the buffer memory without accessing the disk-like recording medium.

10 Claims, 9 Drawing Sheets

F I G. 7
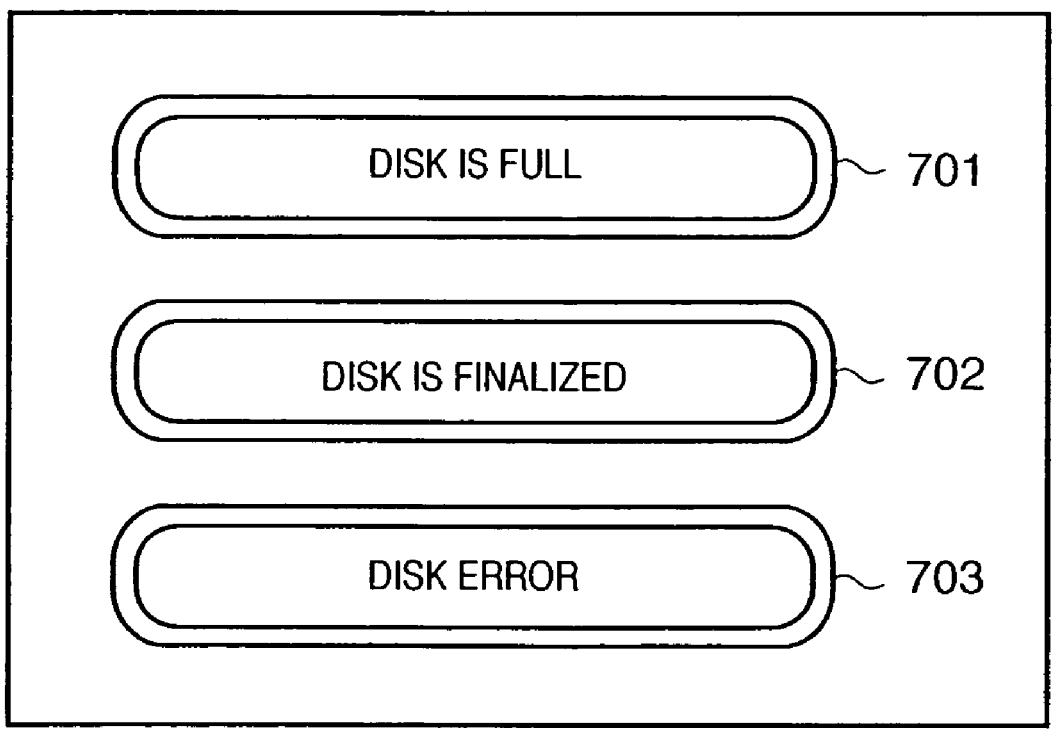

DATA PROCESSING APPARATUS AND ITS CONTROL METHOD, PROGRAM, AND STORAGE MEDIUM

FIELD OF THE INVENTION

The present invention relates to a data processing apparatus which can at least read out data from a detachable disk-like recording medium.

BACKGROUND OF THE INVENTION

Conventionally, a disk video camera which records sensed image data on a disk medium is known. Since such disk video camera records/plays back data in accordance with management information used to manage data recorded on a disk, this management information must be played back first when a disk is exchanged. Upon exchanging the disk, laser power adjustment processing and the like are also executed together.

However, in general, an access speed to the disk is low, and it takes much time to read out management data from the mounted disk. In order to adjust the laser power, after predetermined reference data are written on the disk using a plurality of levels of different laser powers, these data are read out, and an optimal laser power value is determined in accordance with the states of the readout data. For this reason, a long startup time is required, and it takes time before the video camera is ready to use.

To solve such problem, for example, Japanese Patent Laid-Open No. 8-153040 discloses the following technique. That is, disk management information is stored in a main body memory. When management information of the mounted disk is stored in the main body memory, the management information stored in the memory is used without reading out the management information from the disk, thus omitting the operation for reading out the management information from the disk, and shortening the startup time.

However, even in an apparatus described in Japanese Patent Laid-Open No. 8-153040 above, when management information of the exchanged disk is not saved in the memory, it must be read out from the disk, thus taking time.

In the video camera, since disks are often exchanged in advance for image sensing at a travel destination or the like, the apparatus disclosed in Japanese Patent Laid-Open No. 8-153040 cannot exchange disks in a power-OFF state, and must exchange disks in a power-ON state. When a power supply is turned on from the power-OFF state, only after management information associated with the mounted disk is read out at that time, the disk can be exchanged with another disk. Hence, a considerably long time is required until a recordable state.

SUMMARY OF THE INVENTION

Therefore, the present invention has been made in consideration of the above problems, and has as its object to shorten the startup time after power ON even when a disk-like recording medium is exchanged, and to quickly set a recordable state.

In order to solve the aforementioned problems, and to achieve the above object, according to the first aspect of the present invention, a data processing apparatus comprising: a power switch; a disk drive for writing and reading out information data to and from a detachable disk-like recording medium; a detection device for detecting attachment of the disk-like recording medium; a storage device which can store management data of the disk-like recording medium read out from the disk-like recording medium; and a control device for controlling the disk drive and the storage device to read out the management data of the disk-like recording medium and to store the management data in the storage device, and checking based on the management data stored in the storage device whether or not the information data can be written in the disk-like recording medium, in response to detection of attachment of the disk-like recording medium by the detection device in an OFF state of the power switch.

According to the second aspect of the present invention, a data processing apparatus comprising: a power switch; a power supply device; a disk drive for writing and reading out information data to and from a detachable disk-like recording medium; a detection device for detecting attachment of the disk-like recording medium; a storage device which can store management data of the disk-like recording medium read out from the disk-like recording medium; and a control device for controlling the power supply device, the disk drive, and the storage device to start power supply, and to read out and store the management data of the disk-like recording medium in the storage device in response to detection of attachment of the disk-like recording medium by the detection device in an OFF state of the power switch, and in that when the power supply of the power supply device is temporarily shut off during a read operation of the management data from the disk-like recording medium, and the power supply is then restarted, the control device restarts the read operation of the management data from a sequel of the management data which has been read out and held in the storage device before the power supply is shut off.

According to the third aspect of the present invention, a method of controlling a data processing apparatus, which comprises a power switch, a disk drive for writing and reading out information data to and from a detachable disk-like recording medium, a detection device for detecting attachment of the disk-like recording medium, and a storage device which can store management data of the disk-like recording medium read out from the disk-like recording medium, comprising: controlling the disk drive and the storage device to read out the management data of the disk-like recording medium and to store the management data in the storage device, and checking based on the management data stored in the storage device whether or not the information data can be written in the disk-like recording medium, in response to detection of attachment of the disk-like recording medium by the detection device in an OFF state of the power switch.

According to the fourth aspect of the present invention, a method of controlling a data processing apparatus which comprises a power switch, a power supply device, a disk drive for writing and reading out information data to and from a detachable disk-like recording medium, a detection device for detecting attachment of the disk-like recording medium, and a storage device which can store management data of the disk-like recording medium read out from the disk-like recording medium, comprising: controlling the power supply device, the disk drive, and the storage device to start power supply, and to read out and store the management data of the disk-like recording medium in the storage device in response to detection of attachment of the disk-like recording medium by the detection device in an OFF state of the power switch, and restarting, when the power supply of the power supply device is temporarily shut off during a read operation of the management data from the disk-like recording medium, and the power supply is then restarted, the read operation of the management data from a sequel of the management data which has been read out and held in the storage device before the power supply is shut off.

According to the fifth aspect of the present invention, a program is characterized by making a computer implement the above control method.

According to the sixth aspect of the present invention, a storage medium is characterized by computer-readably storing the above program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 shows a display example of unrecordable disk warnings;

DETAILED DESCRIPTION OF THE PREFERRED EMBODIMENTS

Preferred embodiments of the present invention will be described in detail hereinafter with reference to the accompanying drawings.

Figure 1:
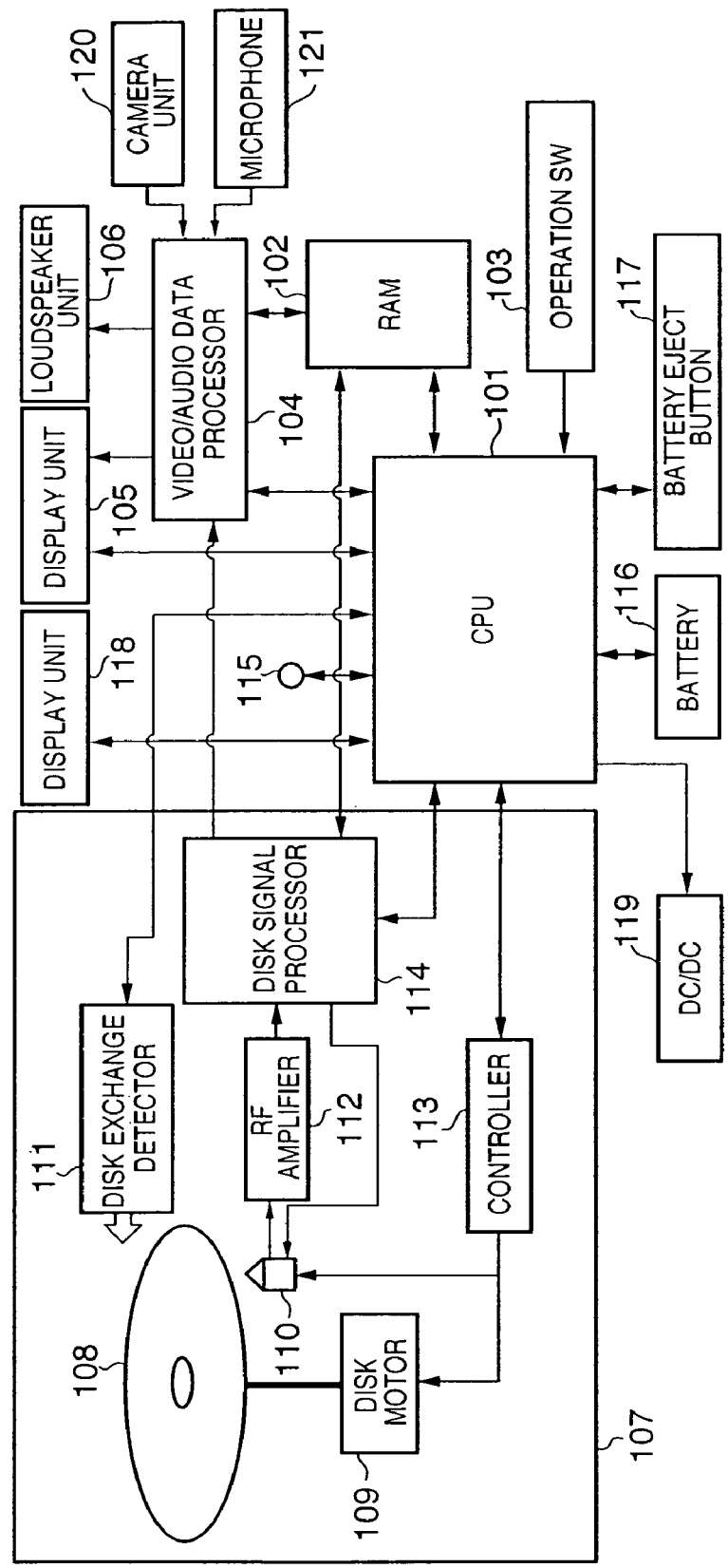
FIG. 1 is a schematic block diagram showing the arrangement of an embodiment of a disk-camcorder to which the present invention is applied.

FIG. 1 is a schematic block diagram showing the arrangement of an embodiment in which the present invention is applied to a disk-camcorder.

Reference numeral 101 denotes a CPU for controlling the operations of respective units. Note that the CPU 101 is fed and can make operations even when a power SW (power switch; to be described later) is OFF.

Reference numeral 102 denotes a RAM which is used as a working area by the CPU 101, and a signal processor and data processor (to be described later). The RAM 102 is also used as a buffer memory for storing management data read out from a disk-like recording medium, and address data.

Reference numeral 103 denotes an operation switch which includes various switches such as a power SW (power switch) for turning on/off a power supply of the main body, a recording trigger, a playback switch, and the like. More specifically, the operation switch 103 comprises mechanical switches, a touch panel, and the like. Also, the operation switch 103 includes a known remote control unit and the like.

While the power SW is OFF, the CPU 101 controls a DC/DC converter (to be described later) to supply electric power to only the CPU 101 and a disk exchange detector 111 (to be described later), thus setting a power OFF mode. In other words, even when the power SW is OFF, the CPU 101 and disk exchange detector 111 always receive electric power. When the power SW is turned on, the CPU 101 controls the DC/DC converter (to be described later) to also supply electric power to respective blocks such as a video/audio data processor, display unit, loudspeaker unit, and disk device (to be described later), thus starting up the disk-camcorder.

Reference numeral 104 denotes a video/audio data processor which encodes video data from a camera unit 120 and audio data from a microphone 121 and outputs them to a disk signal processor 114 in a recording mode, and demultiplexes stream data input from the disk signal processor 114 into video data and audio data and decodes these data in a playback mode.

Reference numeral 105 denotes a display unit which comprises a liquid crystal display or the like, and displays video data input from the video/audio data processor 104. Also, the display unit 105 is used to display various kinds of menu information and the like.

Reference numeral 106 denotes a loudspeaker unit which D/A-converts audio data input from the video/audio data processor 104 and outputs the analog audio data. Also, the loudspeaker unit 106 is used to output various operation tones, warning tones, and the like.

Reference numeral 107 denotes a disk device (disk drive) for processing a plurality of types of disk-like recording media.

Reference numeral 108 denotes a disk-like recording medium (to be also referred to as a disk hereinafter) which can be mounted on the disk device 107. As the types of disks, a DVD-RW which can repetitively record data, a DVD-R as a write once, read many disk, and the like may be used. However, the present invention is not particularly limited to them.

Reference numeral 109 denotes a disk motor for rotating the disk-like recording medium 108 mounted on the disk device 107.

Reference numeral 110 denotes a pickup unit which includes a pickup head for writing and reading a signal by irradiating the disk-like recording medium 108 with a light beam, and a motor for moving this pickup head in the radial direction of the disk-like recording medium 108. Although not shown, the pickup head includes a tracking mechanism and focusing mechanism for moving a lens.

The CPU 101 controls a controller 113 and disk signal processor 114 to control the pickup unit 110, thereby executing beam power adjustment processing for adjusting the power of the light beam to optimal power. More specifically, predetermined data is recorded on the disk 108 while changing the light beam power. The recorded data are read, and the optimal power is determined in accordance with the states of the read data. In this embodiment, this beam power adjustment processing is executed when the power SW is turned on, and when a new disk 108 is mounted in the power ON state.

Reference numeral 111 denotes a disk exchange detector which can detect if the disk-like recording medium 108 mounted on the disk device 107 is exchanged, and can inform the CPU 101 of the detection result, even when the power SW (103) is OFF. Note that the disk exchange detection method may be a method of detecting an open/close state of a disk cover, or a method of detecting if the disk-like recording medium is attached/detached to/from a disk fixing portion.

Reference numeral 112 denotes an RF amplifier which amplifies a signal read out by the pickup unit 110, and outputs the amplified signal to a disk signal processor (to be described later).

Reference numeral 113 denotes a controller which drives the disk motor 109 and pickup unit 110 in accordance with a control signal from the CPU 101.

Reference numeral 114 denotes a disk signal processor which multiplexes encoded video and audio data from the video/audio data processor 104, and other additional data, applies required processing such as error correction encoding processing and the like to the multiplexed data, and outputs that data to the pickup unit 110 in the recording mode, and which decodes a playback signal input from the RF amplifier 112, applies error correction to the decoded playback signal, and outputs stream data to the video/audio data processor 104 in the playback mode.

Reference numeral 115 denotes an LED which can be turned on, blinked, and turned off under the control of the CPU 101.

Reference numeral 116 denotes a battery which is detachable from the main body.

Reference numeral 117 denotes a battery eject button which is pressed by the user when the battery 116 to be ejected.

Reference numeral 118 denotes a display unit which comprises a liquid crystal display or the like, and makes a text display of warnings and the like.

Reference numeral 119 denotes a DC/DC converter which are connected to the respective blocks although not shown, and can independently supply electric power to the respective blocks under the control of the CPU 101.

Reference numeral 120 denotes a camera unit which senses an object, and outputs video data; and 121, a microphone for outputting audio data.

Figure 2:
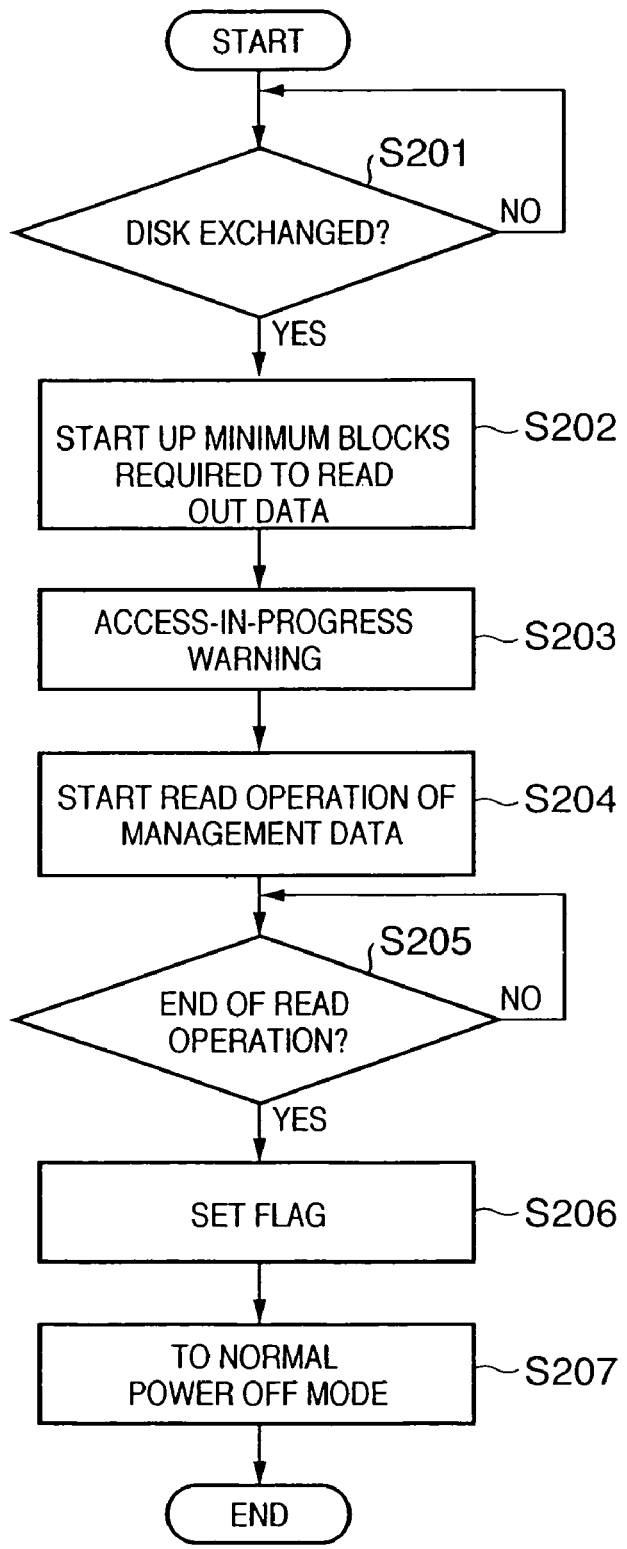
FIG. 2 is a flowchart showing the processing of the disk-camcorder according to the embodiment of the present invention.

The read and update operation of management data from the disk-like recording medium when the disk-like recording medium is exchanged in the disk-camcorder 100 of this embodiment while the power SW of the main body is OFF will be described below with reference to FIG. 2.

[Step S201]: If the user exchanges disk-like recording media 108 while the power SW is OFF and electric power is supplied to only the CPU 101 and disk exchange detector 111, the disk exchange detector 111 informs the CPU 101 that the disk-like recording medium 108 is exchanged.

[Step S202]: The CPU 101, which is informed of the exchange of the disk-like recording medium 108, controls the DC/DC converter 119 to supply electric power to minimum blocks (disk device 107 and the like) required to read out management data from the disk-like recording medium 108, thus starting up the disk device 107 and the like.

[Step S203]: A warning is produced to inform the user that the disk-like recording medium 108 is being accessed. Note that the warning method may be attained using the LED 115 or making text display on the display unit 118. Also, a warning tone using the loudspeaker unit 106 may be produced. Furthermore, a warning may be generated in combination of the above components.

[Step S204]: The CPU 101 clears a management data read completion flag prepared in the RAM 102, and management data begins to be read out from the disk-like recording medium 108.

[Step S205]: A signal read out from the disk-like recording medium 108 by the pickup unit 110 is amplified by the RF amplifier 112, and the amplified signal is supplied to the disk signal processor 114. The disk signal processor 114 decodes the received signal and applies error correction to that signal. Note that the operation for reading out a signal from the disk-like recording medium is known to those who are skilled in the art, and a description thereof will be omitted.

The readout management data and current read address are stored in the RAM 102. Note that only latest data is stored and updated at that address.

Upon completion of the operation for reading out the management data of the disk from the disk-like recording medium 108, the flow advances to [step S206].

[Step S206]: The CPU 101 sets the management read completion flag.

[Step S207]: The CPU 101 quits the blocks (disk device 107 and the like) required to read out management data from the disk-like recording medium 108, and controls the DC/DC converter 119 to quit power supply to the disk device 107 and the like, thus resuming a normal power OFF mode. At this time, in this embodiment, light beam power adjustment processing is inhibited to execute.

As described above, when a disk is exchanged even while the power SW of the disk-camcorder is OFF, the management data of that disk is read out and is stored in the buffer memory. Hence, the problem that the analysis operation of the disk-like recording medium takes time and the disk-camcorder cannot be used immediately when the user turns on the power SW for the next time can be solved.

Figure 3:
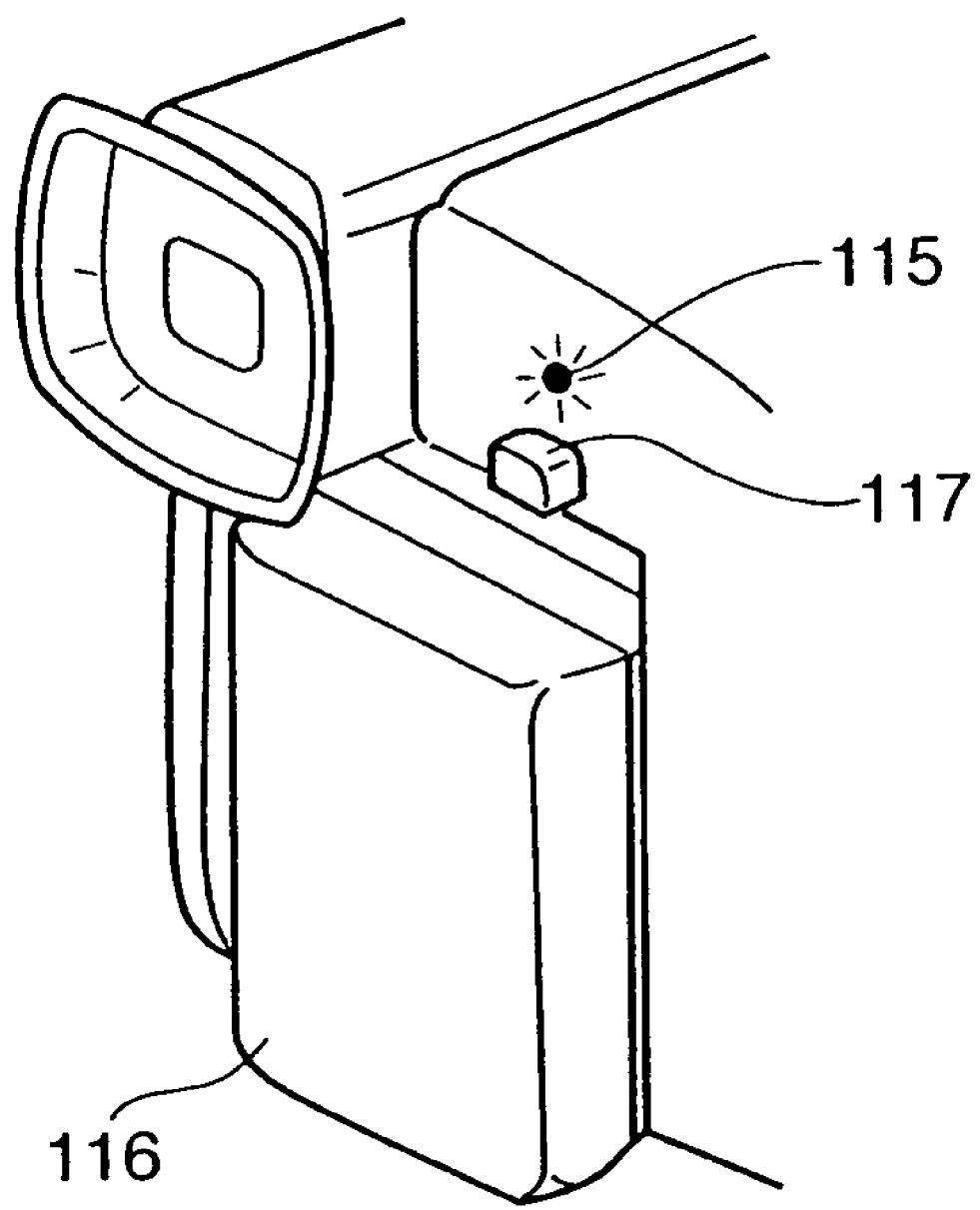
FIG. 3 is a back view of the disk-camcorder according to the embodiment of the present invention.

FIG. 3 is a back view of the disk-camcorder 100 of this embodiment. An example of a warning during disk access when the disk-like recording medium is exchanged while the power SW of the main body is OFF will be explained.

Reference numeral 116 denotes a battery which is detachable from the main body.

Reference numeral 115 denotes an LED controlled by the CPU 101.

When the disk device 107 reads out data from the disk-like recording medium 108, the LED 115 begins to turn on or blink under the control of the CPU 101, thus informing the user that the disk is being accessed. The ON or blinking state of the LED 115 may continue until the operation for reading out data from the disk-like recording medium 108 is completed, or may come to an end after an elapse of a predetermined period of time. This LED 115 is located in the vicinity of the battery 116 and the battery eject button 117 (to be described later), thus improving the effects.

Reference numeral 117 denotes a battery eject button which is pressed by the user when the battery 116 to be ejected.

When the disk device 107 reads out data from the disk-like recording medium 108, the battery eject button 117 is locked until the data read access is completed under the control of the CPU 101, thus preventing the battery from being ejected during disk access.

Note that the warning display by the LED 115 and the lock operation of the battery eject button 117 may be freely turned on/off by the user using a menu or the like.

Figure 4:
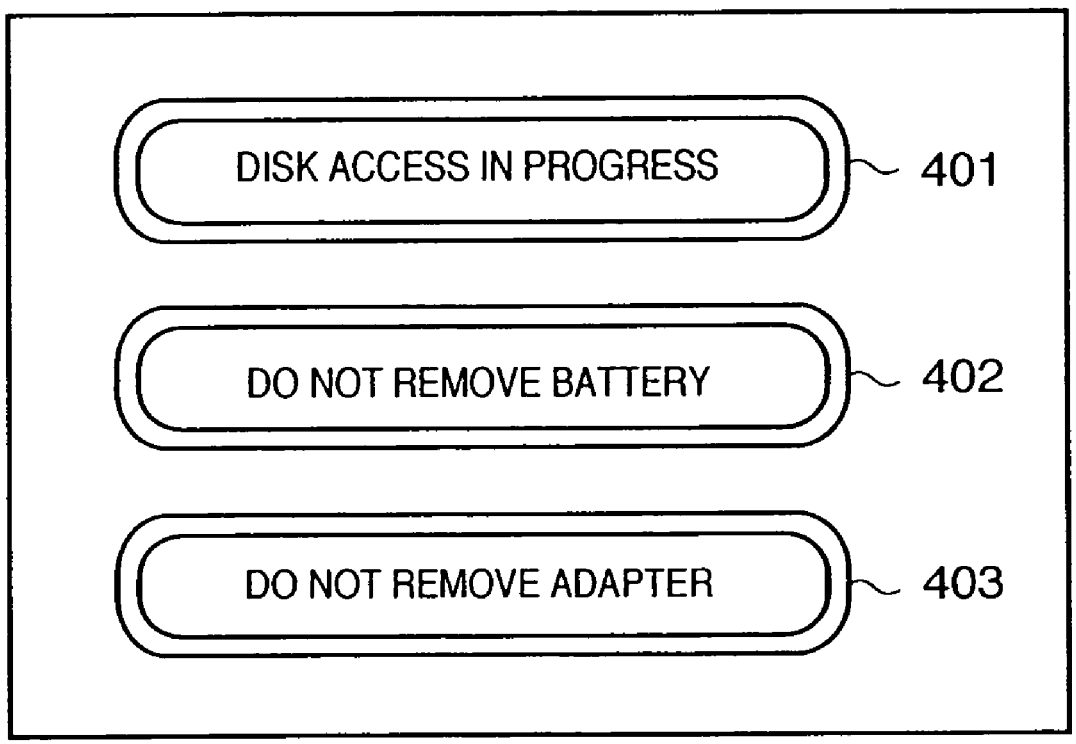
FIG. 4 shows a display example of warnings during disk access.

FIG. 4 shows a display example of warnings during disk access, and a warning example using the display unit 118 and loudspeaker unit 106 will be explained.

Reference numeral 401 denotes a display example of a warning message output during disk access.

Reference numeral 402 denotes a display example of a warning message output when the apparatus main body is driven by the battery.

Reference numeral 403 denotes a display example of a warning message output when the apparatus main body is driven by a compact adapter.

Upon reading out data from the disk-like recording medium 108 by the disk device 107, the CPU 101 reads out the warning message 401 indicating that the disk-like recording medium 108 is currently being accessed from text data pre-stored in the RAM 102, and displays that message on the display unit 118. Furthermore, when the battery 116 is detected, and the apparatus main body is driven by the battery, the CPU 101 displays text data of the warning message 402 on the display unit 118. When the apparatus main body is driven by the compact adapter, the CPU 101 displays text data of the warning message 402 on the display unit 118. The warning messages 401 and 402 (or 403) may be alternately displayed, or either one of these messages may be displayed. Also, by producing a warning tone from the loudspeaker unit 106, the user can receive a warning in both visible and audible ways.

Furthermore, not only the text data of the warning messages but also audio data are pre-stored in the RAM 102. Hence, the warning message may be displayed on the display unit 118, and the loudspeaker unit 106 may play back audio data "disk is being accessed" or the like, thus producing a more effective warning.

Note that the warning display on the display unit 118 and the warning tone or audible warning output by the loudspeaker unit 106 may be freely turned on/off by the user using a menu or the like.

As described above, by producing a warning while management data is read out from the disk, operation errors due to the vibration during disk access or detachment of the battery or compact adapter can be prevented.

Figure 5:
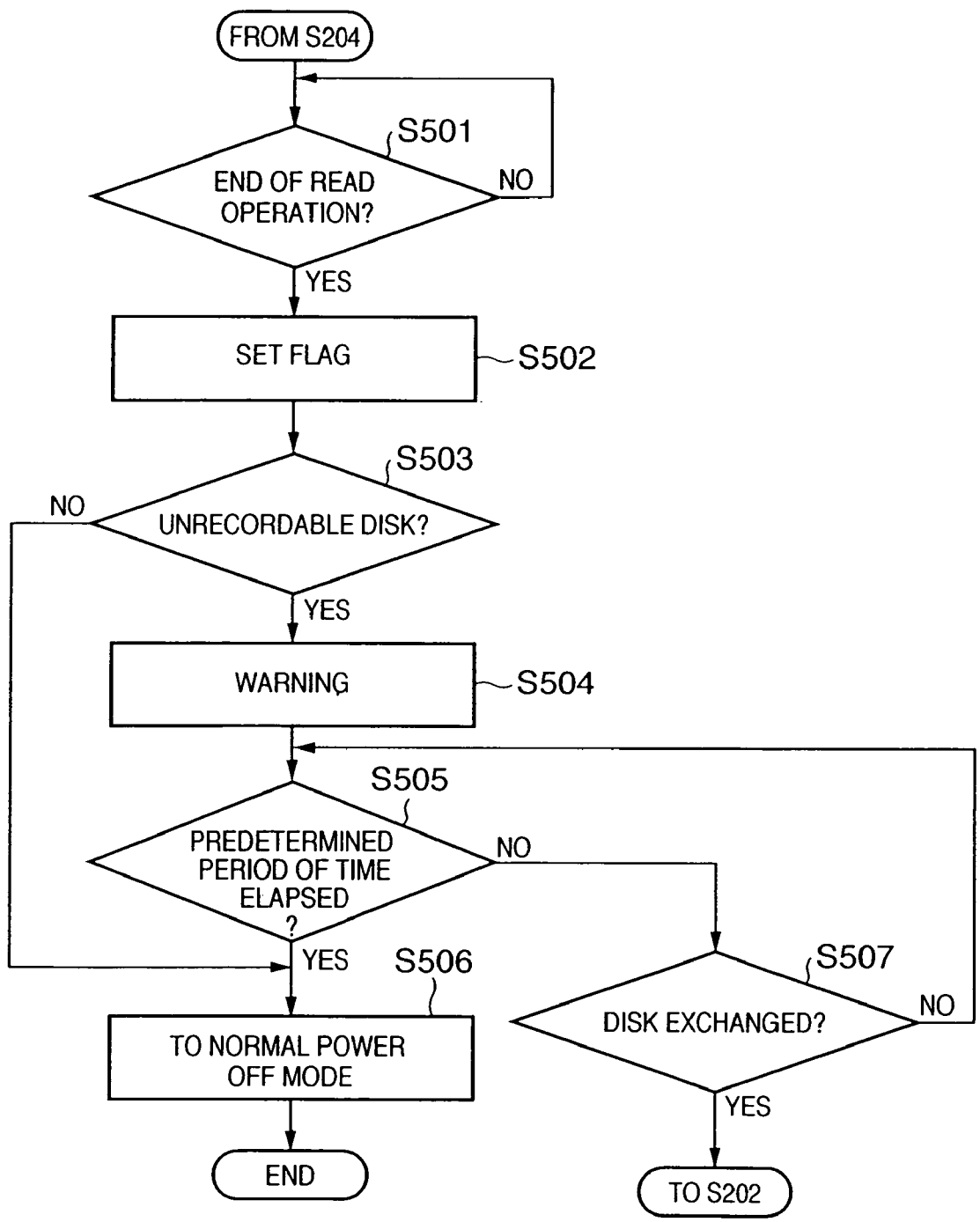
FIG. 5 is a flowchart showing the processing of the disk-camcorder according to the embodiment of the present invention.

The operation executed when a disk-like recording medium which is exchanged while the power SW of the main body is OFF is an unrecordable one in the disk-camcorder of this embodiment will be described below with reference to FIG. 5. The flow of FIG. 5 is executed after the processing in step S204 in FIG. 2.

[Step S501]: The disk device 107 completes the read operation of management data from the currently mounted disk-like recording medium 108.

[Step S502]: The CPU 101 sets the management data read completion flag in the RAM 102.

[Step S503]: The CPU 101 analyzes the readout management data. If it is determined based on the analysis result of the management data that the disk-like recording medium 108 is an unrecordable disk, the flow advances to [step S504]. On the other hand, if the disk-like recording medium 108 is a recordable disk, the CPU 101 quits the blocks (disk device 107 and the like) required to read out management data from the disk-like recording medium 108, and controls the DC/DC converter 119 to quit power supply to the disk device 107 and the like, thus resuming a normal power OFF mode (step S506).

[Step S504]: A warning is generated to inform the user that the exchanged disk-like recording medium 108 is an unrecordable disk.

Note that the warning method may be attained using the LED 115 or making text display on the display unit 118. Also, a warning tone using the loudspeaker unit 106 may be produced. Furthermore, a warning may be generated in combination of the above components.

Furthermore, if that disk is an error disk from which management data cannot be read out, the disk may be ejected.

It is checked if a predetermined period of time (several sec to several min) has elapsed after the disk is exchanged (step S505). If the predetermined period of time has elapsed, the flow advances to step S506 to resume the normal power OFF mode. If the predetermined period of time has not elapsed yet in step S505, it is checked if the disk is exchanged (step S507). If the disk is exchanged, the flow returns to step S202 in FIG. 2; otherwise, the flow returns to step S505.

As described above, if it can be determined as a result of the read operation of management data from the disk-like recording medium that the currently mounted disk-like recording medium is an unrecordable disk, since a warning is produced before power supply of the camcorder 100 is stopped, the user can recognize the unrecordable disk immediately. Hence, the user can exchange that disk to a recordable disk-like recording medium.

The operation executed when the power SW of the main body is turned on while the disk-like recording medium is mounted will be described below with reference to FIG. 6.

[Step S601]: The user turns on the power SW.

[Step S602]: The CPU 101 controls the DC/DC converter 119 to supply electric power to respective blocks such as the video/audio data processor 104, display unit 105, loudspeaker unit 106, and disk device 107, thus normally starting up the disk-camcorder.

[Step S603]: The CPU 101 confirms the management data stored in the RAM 102 while accessing the disk-like recording medium 108 currently mounted on the disk device 107.

[Step S604]: If it is determined based on the confirmation result of the management data that the disk-like recording medium 108 currently mounted on the disk device 107 is an unrecordable one, the flow advances to [step S605]; otherwise, the flow advances to [step S606].

[Step S605]: A warning is produced to inform the user that the disk-like recording medium 108 currently mounted on the disk device 107 is an unrecordable disk. After that, a playback preparation state is set.

Note that the warning method may be attained using the LED 115 or making text display on the display unit 118. Also, a warning tone using the loudspeaker unit 106 may be produced. Furthermore, a warning may be generated in combination of the above components.

[Step S606]: The CPU 101 displays the management data stored in the RAM 102 on the display unit 105, and informs the user of the number of data recorded on the disk-like recording medium 108 currently mounted on the disk device 107, the remaining capacity, and the like. During this display, the light beam power adjustment processing of the pickup unit 110 is executed. After that, a recording or playback preparation state is set.

As described above, according to this embodiment, when a disk is exchanged during power OFF, management data is read out and is stored in the internal memory, and the power supply is then turned off. Hence, when the power supply of the main body is turned on for the next time, the disk state can be recognized by confirming the management data stored in the memory without waiting for completion of the read operation of the management information from the disk-like recording medium. For this reason, the startup time can be shortened. When a disk is exchanged during power OFF, and that exchanged disk-like recording medium is an unrecordable one, a warning is produced, so as to prevent the user from performing any recording operation by mistake using the unrecordable disk-like recording medium.

When no disk exchange occurs during power OFF, since the management of the disk mounted upon previous power OFF is kept stored in the internal memory, the startup time can be similarly shortened.

FIG. 7 shows a display example of unrecordable disk warnings, and a warning example using the display unit 118 and loudspeaker unit 106 will be explained.

Reference numeral 701 denotes a display example of a warning message output when the mounted disk-like recording medium is full of data, and no more recording is allowed.

Reference numeral 702 denotes a display example of a warning message output when the mounted disk-like recording medium is finalized.

Reference numeral 703 denotes a display example of a warning message output when the mounted disk-like recording medium is an error disk from which data cannot be read out.

If it is determined as a result of the read operation of data from the disk-like recording medium 108 by the disk device 107 that the currently mounted disk-like recording medium 108 is full of data, and is a disk that allows no more recording, the CPU 101 reads out the warning message 701 indicating disk full from text data pre-stored in the RAM 102, and displays it on the display unit 118. If the mounted disk-like recording medium 108 is a finalized disk, the CPU 101 displays text data of the warning message 702 on the display unit 118. On the other hand, if the mounted disk-like recording medium 108 is an error disk from which data cannot be read out, the CPU 101 displays text data of the warning message 703 on the display unit 118. Also, by producing a warning tone from the loudspeaker unit 106, the user can receive a warning in both visible and audible ways.

Furthermore, not only the text data of the warning messages but also audio data are pre-stored in the RAM 102. Hence, the warning message may be displayed on the display unit 118, and the loudspeaker unit 106 may play back audio data "this disk is finalized" or the like, thus producing a more effective warning.

Note that the warning display on the display unit 118 and the warning tone or audible warning output by the loudspeaker-unit 106 may be freely turned on/off by the user using a menu or the like.

Figure 8:
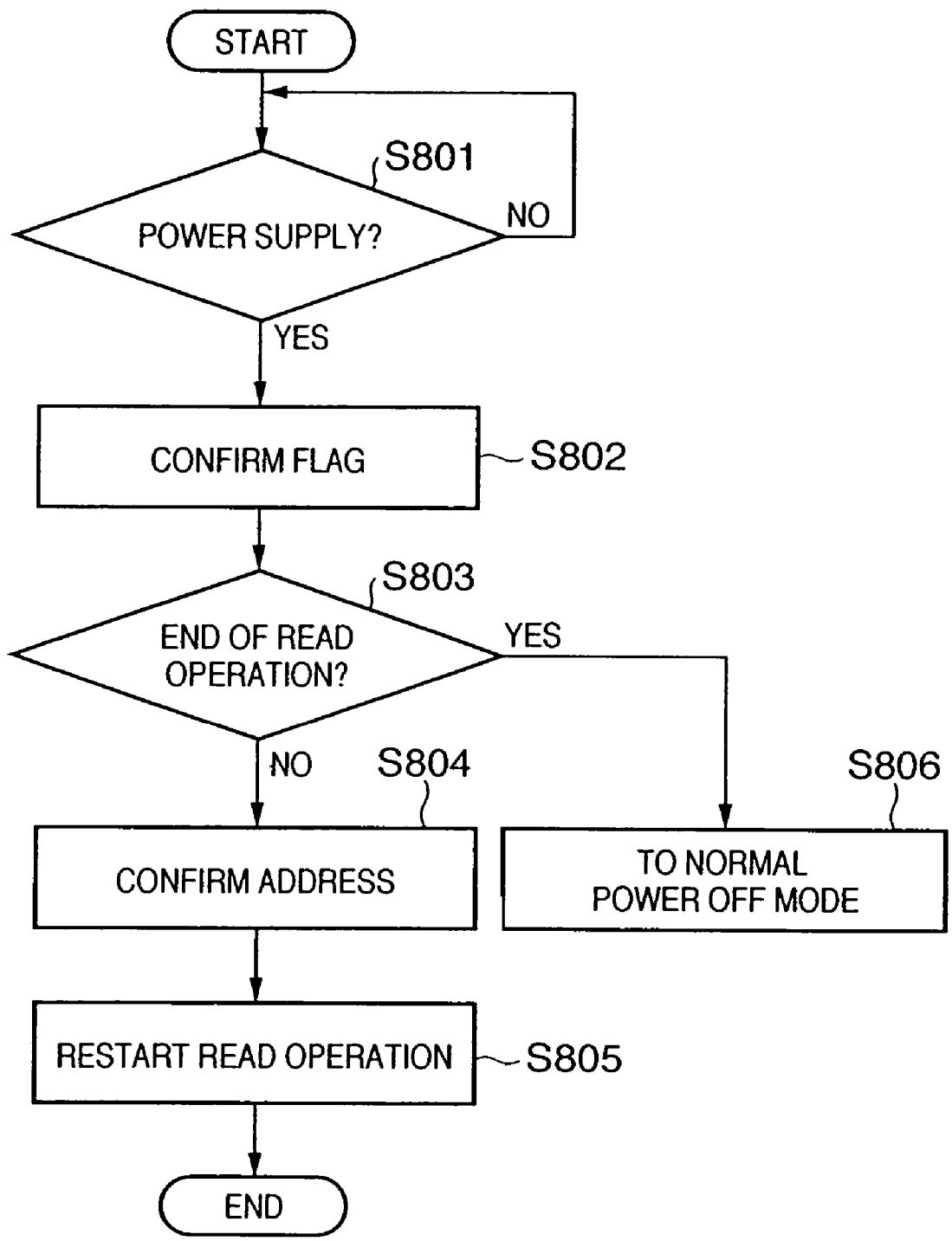
FIG. 8 is a flowchart showing the processing of the disk-camcorder according to the embodiment of the present invention.

The management data read restart operation executed when the battery or compact adapter is detached although the warning is produced, as described above, and the battery is attached again in the disk-camcorder of this embodiment will be described below with reference to FIG. 8. Note that the operation from step S801 in the flowchart of FIG. 8 indicates the operation from when the battery or compact adapter is temporarily detached, and is attached again during a period from step S202 to step S207 in FIG. 2.

[Step S801]: The user attaches the battery or compact adapter again.

[Step S802]: The CPU 101 confirms the management data read completion flag stored in the RAM 102.

[Step S803]: If the management data read completion flag is set, the CPU 101 sets the main body in the normal power OFF mode (step S806). On the other hand, if the flag is not set, the flow advances to [step S804].

[Step S804]: The CPU 101 confirms the address of the management data which is stored in the RAM 102 and was read out immediately before the power supply was shut off.

[Step S805]: The CPU 101 controls the DC/DC converter 119 to supply electric power to minimum blocks (disk device 107 and the like) required to read out management data from the disk-like recording medium 108, thus starting up the disk device 107 and the like, and controls the pickup unit 110 via the controller 113 to restart the read operation of the management data from the sequel of the address confirmed in [step S804]. The subsequent processes are the same as those in step S205 and subsequent steps in FIG. 2.

As described above, when the battery or compact adapter is attached/detached during the read operation of the management data, since the read operation of the management data is restarted from the sequel of the stored address, the management data need not be read out from the very beginning, and a time required until a usable state can be shortened.

Figure 9:
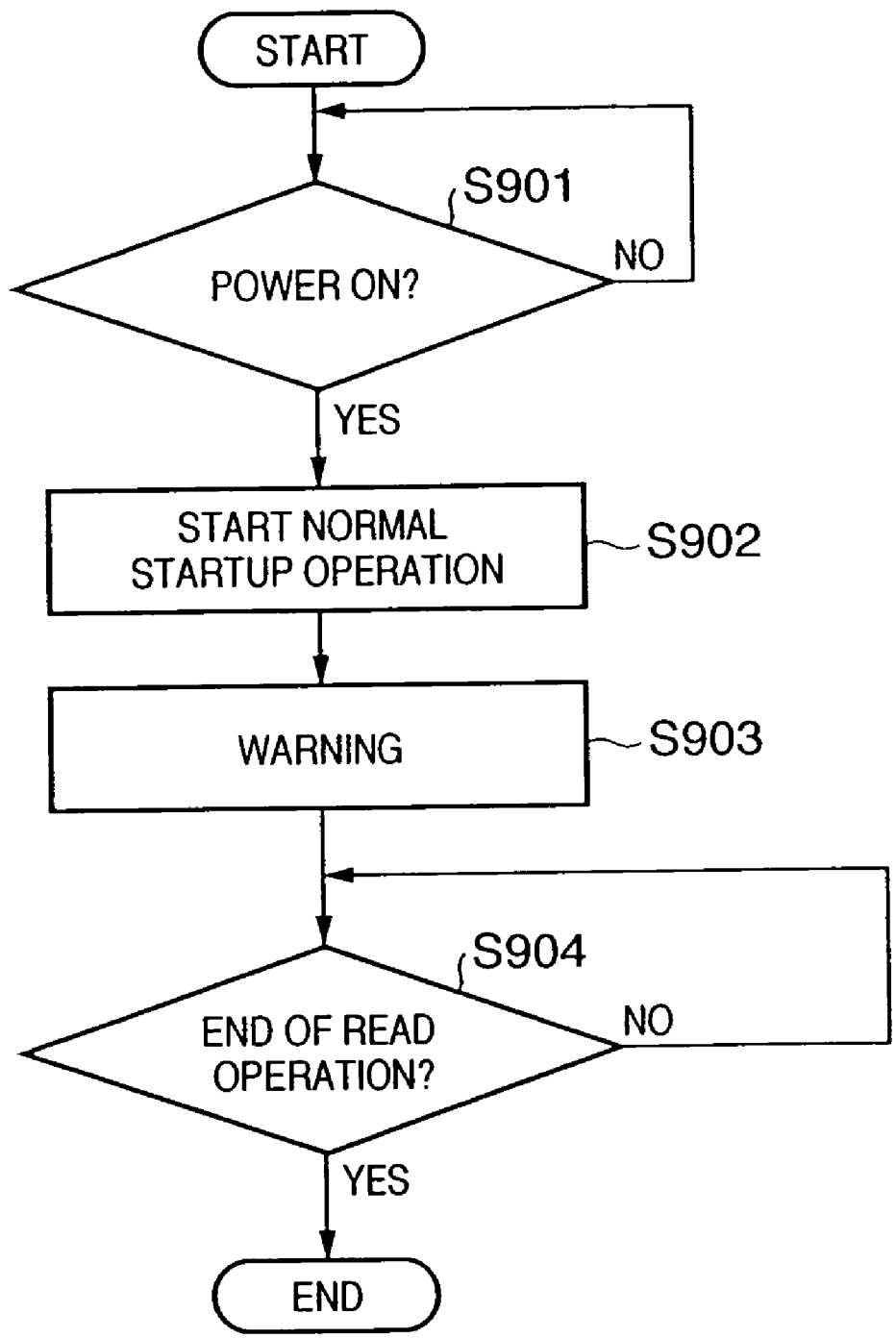
FIG. 9 is a flowchart showing the processing of the disk-camcorder according to the embodiment of the present invention.

The operation executed when the power SW of the main body is turned on while reading out management data from the disk-like recording medium in the disk-camcorder of this embodiment will be described below with reference to FIG. 9. The processing in FIG. 9 is executed when the power SW is turned on during a period from step S202 to step S207 in FIG. 2.

[Step S901]: The user turns on the power SW during the read operation of management data from the disk-like recording medium 108 by the disk device 107.

[Step S902]: The CPU 101 controls the DC/DC converter 119 to supply electric power to respective blocks such as the video/audio data processor 104, display unit 105, and loudspeaker unit 106, thus normally starting up the disk-camcorder.

[Step S903]: A warning is produced to inform the user that the disk-like recording medium 108 is in access. Note that the warning method may be attained using the LED 115 or making text display on the display unit 118. Also, a warning tone using the loudspeaker unit 106 may be produced. Furthermore, a warning may be generated in combination of the above components.

[Step S904]: Upon completion of the read operation of the management data of the disk from the disk-like recording medium 108, the disk-camcorder is set in a recording or playback standby state.

As described above, even when the power SW of the disk-camcorder main body is turned on during the read operation of management data, the startup operation is performed while continuing the read operation of the management data without aborting the read operation of the management data. Hence, the read operation of the management data need not be redone from the beginning, and a time required until a usable state can be shortened.

As described above, according to the above embodiment, when exchange of a disk-like recording medium is detected even while the power SW of the main body is OFF, management data of the disk is read out and is stored in the buffer memory. Hence, when the power SW of the main body is turned on for the next time, the need for the read operation from the disk can be obviated, and a time required from when the power SW is turned ON until completion of the startup operation can be shortened, thus allowing the user to immediately use the camcorder.

Furthermore, since a warning is produced while management data is read out from the disk-like recording medium, operation errors due to vibration or the like during disk access can be prevented.

Moreover, since a warning is produced when it is determined based on the analysis result of the management data read out from the disk-like recording medium that the exchanged disk is an unrecordable one, the user can immediately exchange that disk to a recordable disk. Hence, when the power SW is turned on for the next time, the camcorder becomes immediately ready to use, thus reducing a stress on the user.

In addition, when the power SW of the main body is turned on, the buffer memory is confirmed without accessing the disk-like recording medium, and when the currently mounted disk is an unrecordable one, a warning is produced. Hence, a wasteful read operation from the disk is avoided, and the startup time can be shortened. In addition, the user can be prevented from performing recording operation by mistake using an unrecordable disk.

Also, the management data read out from the disk-like recording medium is always backed up. When electric power to the main body is temporarily shut off, and is supplied again, the read operation of the management data is restarted from the sequel of data read out before the electric power is shut off. Hence, when electric power is shut off due to an accident and is supplied again, the management data need not be read out from the beginning, and a time until a usable state can be shortened.

In addition, even when the power SW of the disk-camcorder main body is turned on during the read operation of the management data, the startup operation is executed while continuing the read operation of the management data without aborting it. Hence, the read operation of the management data need not be redone, and a time until a usable state can be shortened.

In the description of the above embodiment, a loading mechanism of the disk-like recording medium assumes a purely mechanical loading mechanism. However, for example, in case of an auto loading mechanism which automatically opens a disk cover upon depression of an eject button, or automatically loads a disk, and so forth, the CPU 101 detects that the eject button is turned on while the power SW is OFF, and issues an instruction to the DC/DC converter 119 to supply electric power to the auto loading mechanism, thus achieving the same operations as in the above embodiment. In case of auto loading, if the auto loading mechanism receives electric power only when the eject button is pressed, wasteful power consumption can be suppressed.

According to the above embodiment, even when a disk-like recording medium is exchanged, the startup time after power ON can be shortened, and a recordable state can be quickly set.

Figure 6:
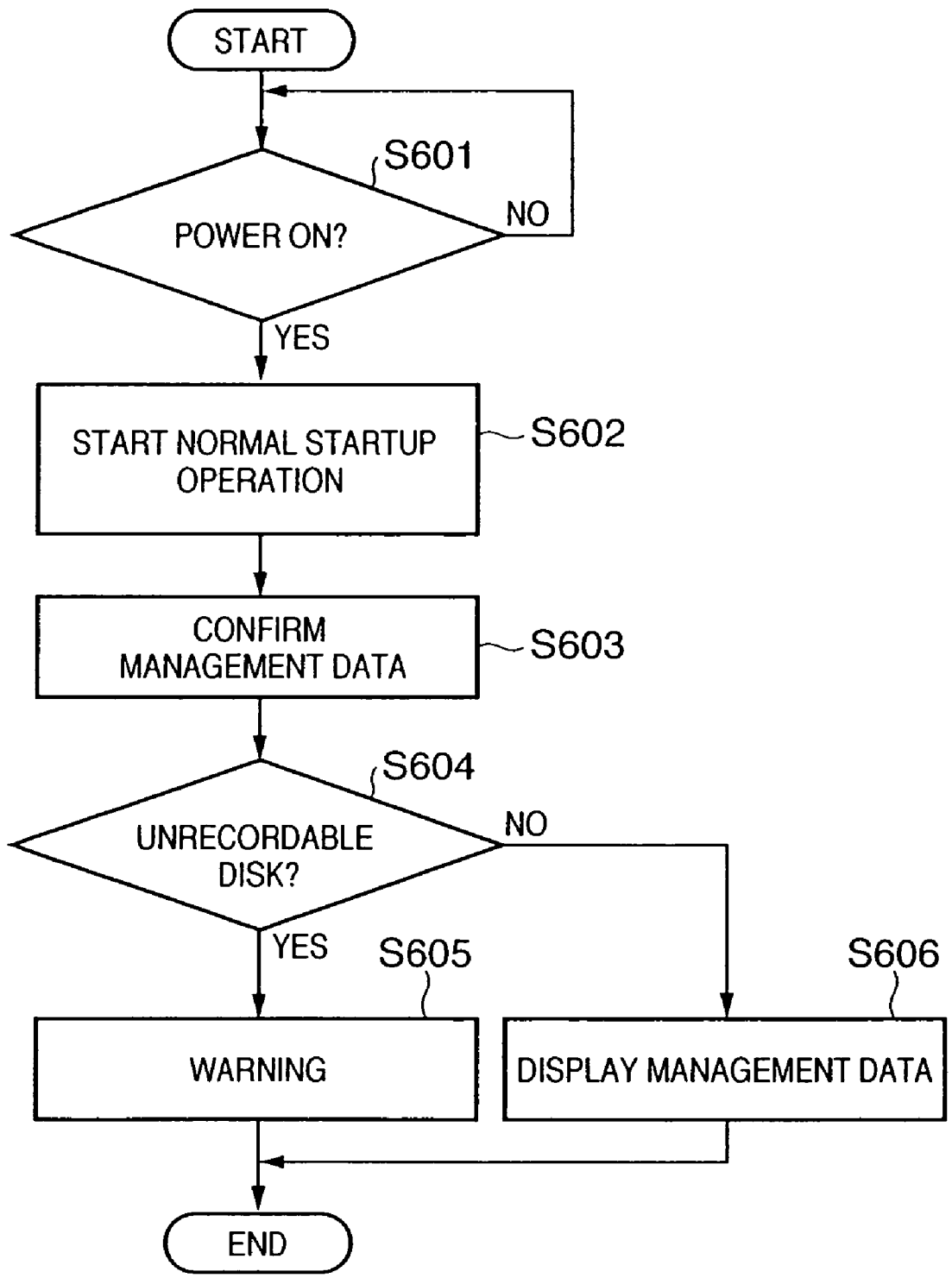
FIG. 6 is a flowchart showing the processing of the disk-camcorder according to the embodiment of the present invention.

In the processes of FIGS. 5 and 6, it is checked if the exchanged disk is a recordable disk. In addition, it may be checked together if the exchanged disk is a reproducible disk, and if that disk is not reproducible, a warning may be produced.

Other Embodiments

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the aforementioned procedures.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priorities from Japanese Patent Applications No. 2004-273973 filed on Sep. 21, 2004 and No. 2005-236736 filed on Aug. 17, 2005, which are hereby incorporated by reference herein.

What is claimed is:

1. A recording apparatus comprising:
   a power switch configured to output a power-off instruction to put the recording apparatus in a power-off state and a power-on instruction to put the recording apparatus in a power-on state;
   a writing and reading unit configured to write data to a disk recording medium and to read data from the disk recording medium;
   a detection unit configured to detect attachment of a new disk recording medium to which data cannot be written, the new disk recording medium being detectable by the detection unit when the recording apparatus is in the power-off state;
   a warning unit configured to perform a warning operation; and
   a control unit, configured to, in response to an output from the detection unit during the power-off state, control the warning unit to perform the warning operation,
   wherein the control unit automatically controls a power supply unit to supply power to the warning unit to perform the warning operation when the recording apparatus is in the power-off state, and controls the power supply unit to stop supplying power to the warning unit when the warning operation is completed.

2. The recording apparatus according to claim 1, wherein the control unit controls the writing and reading unit to read data from the new disk recording medium if the new disk recording medium is attached when the recording apparatus is in the power-off state, and controls the warning unit to inform a user that a read operation of reading data from the new disk recording medium is in progress during the power-off state of the recording apparatus.

3. The recording apparatus according to claim 1, wherein the control unit controls the power supply unit to supply power to the writing and reading unit if the new disk recording medium is attached when the recording apparatus is in the power-off state, and controls the power supply to stop supplying power to the writing and reading unit at an end of a predetermined period after attachment of the new disk recording medium.

4. The recording apparatus according to claim 1, further comprising a memory that stores data,
   wherein the control unit controls the writing and reading unit to read management data from a disk recording medium, and controls the writing and reading unit to store the read management data in the memory if the disk recording medium is attached when the recording apparatus is in the power-off state, and discriminates, responsive to the power-on instruction from the power switch, whether data can be written to the disk recording medium in accordance with the management data read from the disk recording medium and stored in the memory.

5. The recording apparatus according to claim 1,
   wherein the warning unit includes a display device that displays an image associated with data read from a disk recording medium, and wherein the control unit controls the display device to display warning information, if it is discriminated that data cannot be written to the disk recording medium.

6. The recording apparatus according to claim 1, wherein the control unit controls the writing and reading unit to read management data from a disk recording medium if the disk recording medium is attached when the recording apparatus is in the power-off state, and discriminates whether data can be written to the disk recording medium based on the read management data when the recording apparatus is in the power-off state.

7. A recording apparatus comprising:
a power switch configured to output a power-off instruction to put the recording apparatus in a power-off state and a power-on instruction to put the recording apparatus in a power-on state;
a writing and reading unit configured to write data to a recording medium and to read the data from the recording medium;
a detection unit configured to detect attachment of a new recording medium to which data cannot be written, the new recording medium being detectable by the detection unit when the recording apparatus is in the power-off state; and
a control unit configured to, in response to an output from the detection unit during the power-off state, control the warning unit to perform a warning operation.

8. A recording apparatus comprising:
a power switch configured to output a power-off instruction to put the recording apparatus in a power-off state and a power-on instruction to put the recording apparatus in a power-on state;
a writing and reading unit configured to write data to a recording medium and to read the data from the recording medium;
a detection unit configured to detect attachment of a new recording medium from which data cannot be read, the new recording medium being detectable by the detection unit when the recording apparatus is in the power-off state; and
a control unit configured to, in response to an output from the detection unit during the power-off state, control the warning unit to perform a warning operation.

9. A recording apparatus comprising:
a power switch configured to output a power-off instruction to put the recording apparatus in a power-off state and a power-on instruction to put the recording apparatus in a power-on state;
an optical beam unit configured to output an optical beam onto an attached disk recording medium;
a power adjusting unit configured to perform a power adjusting operation on the optical beam output from the optical beam unit; and
a control unit configured to control the power adjusting unit,
wherein the control unit controls the power adjusting unit to perform the power adjusting operation if a new disk recording medium is attached when the recording apparatus is in the power-on state, and
wherein the control unit inhibits the power adjusting unit from performing the power adjusting operation if a new disk recording medium is attached when the recording apparatus is in the power-off state.

10. A recording apparatus comprising:
a power switch configured to output a power-off instruction to put the recording apparatus in a power-off state and a power-on instruction to put the recording apparatus in a power-on state;
a writing and reading unit configured to write data to a recording medium and to read the data from the recording medium; and
a control unit configured to control the writing and reading unit,
wherein the control unit controls the writing and reading unit, if a new recording medium is attached when the recording apparatus is in the power-off state, to read the management information from the new recording medium and, if the power-on instruction is output from the power switch during reading of the management information from the new recording medium, to continue reading the management information from the new recording medium without stopping the reading of the management information from the new recording medium.

* * * * *